United States Patent
Furuta

(10) Patent No.: US 11,712,939 B2
(45) Date of Patent: Aug. 1, 2023

(54) VEHICLE AND METHOD OF CONTROLLING VEHICLE SUSPENSION

(71) Applicant: TOYOTA JIDOSHA KABUSHIKI KAISHA, Toyota (JP)

(72) Inventor: Hiroki Furuta, Sunto-gun Shizuoka-ken (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 17/890,760

(22) Filed: Aug. 18, 2022

(65) Prior Publication Data
US 2023/0072130 A1 Mar. 9, 2023

(30) Foreign Application Priority Data
Sep. 3, 2021 (JP) .................................. 2021-143655

(51) Int. Cl.
*B60G 17/016* (2006.01)

(52) U.S. Cl.
CPC .... *B60G 17/016* (2013.01); *B60G 2400/0511* (2013.01); *B60G 2400/0512* (2013.01); *B60G 2500/10* (2013.01)

(58) Field of Classification Search
CPC .......... B60G 17/016; B60G 2400/0511; B60G 2400/0512; B60G 2500/10
See application file for complete search history.

(56) References Cited

U.S. PATENT DOCUMENTS

| 8,191,903 B2* | 6/2012 | Beuermann .......... B60G 17/052 701/37 |
| 11,390,129 B1* | 7/2022 | Edren ................. B60G 17/0162 |
| 11,529,836 B1* | 12/2022 | Schubart ............... B60G 13/08 |
| 2005/0098964 A1* | 5/2005 | Brown ..................... B60G 3/06 280/5.5 |
| 2005/0236894 A1* | 10/2005 | Lu .......................... B62D 11/08 303/139 |
| 2007/0029711 A1* | 2/2007 | Ehara ..................... B60G 17/08 267/64.28 |
| 2008/0086248 A1* | 4/2008 | Lu ........................ B60T 8/17552 701/41 |
| 2014/0379215 A1* | 12/2014 | Kikuchi ............... B60G 17/018 701/37 |
| 2018/0154723 A1 | 6/2018 | Anderson et al. |
| 2019/0023095 A1* | 1/2019 | Ficca .................. B60W 30/025 |
| 2020/0317018 A1* | 10/2020 | Nong ............... B60G 17/01908 |
| 2021/0354523 A1* | 11/2021 | Hirao ...................... F16F 15/02 |
| 2022/0105809 A1* | 4/2022 | Yamamoto ...... B60W 30/18145 |

FOREIGN PATENT DOCUMENTS

WO WO-2015169530 A1 * 11/2015 ......... B60G 17/0165

* cited by examiner

*Primary Examiner* — Toan C To
(74) *Attorney, Agent, or Firm* — Dinsmore & Shohl LLP

(57) ABSTRACT

A vehicle includes a first actuator, one or more second actuators, and an electronic control unit. The first actuator is configured to control a stroke of a suspension for a control target wheel. The one or more second actuators is configured to control the stroke of the suspension and more responsive than the first actuator. The electronic control unit is configured to: execute a calculation process to calculate a required control amount for at least one of roll control and pitch control of the vehicle; and execute a command process to distribute and command the required control amount to the first actuator and the one or more second actuators.

6 Claims, 7 Drawing Sheets

VEHICLE AND METHOD OF CONTROLLING VEHICLE SUSPENSION

CROSS-REFERENCE TO RELATED APPLICATION

The present disclosure claims priority under 35 U.S.C. § 119 to Japanese Patent Application No. 2021-143655, filed on Sep. 3, 2021, which is incorporated herein by reference in its entirety.

BACKGROUND

Technical Field

The present disclosure relates to a vehicle provided with first and second actuators that are different in responsiveness to each other to control a suspension stroke, and a method of controlling a vehicle suspension.

Background Art

US 2018/0154723 A1 discloses a technique for controlling an active suspension based on information about a travel route of a vehicle wheel received from an automated driving controller.

SUMMARY

The responsiveness required for actuators used for the control of the suspension stroke depends on the purpose of use. Therefore, when using the actuators mounted on a vehicle for posture control of the vehicle (more specifically, for at least one of roll control and pitch control), poor responsiveness of the actuators used may make it difficult to achieve the posture control at the expected level of responsiveness.

On the other hand, some highly responsive actuators, such as a full active actuator, are not energy efficient because they basically continue to consume energy during the posture control. Also, some highly responsive actuators, such as a semi-active actuator, have limited usable conditions. Therefore, when performing the posture control, it is desirable to achieve both responsiveness and other requirements such as energy saving.

The present disclosure has been made in view of the problem described above, and an object of the present disclosure is to provide a vehicle and a method of controlling a vehicle suspension, which can perform at least one of roll control and pitch control while achieving both responsiveness and other requirements such as energy saving.

A vehicle according to the present disclosure includes a first actuator, one or more second actuators, and an electronic control unit. The first actuator is configured to control a stroke of a suspension for a control target wheel. The one or more second actuators is configured to control the stroke of the suspension and more responsive than the first actuator. The electronic control unit is configured to: execute a calculation process to calculate a required control amount for at least one of roll control and pitch control of the vehicle; and execute a command process to distribute and command the required control amount to the first actuator and the one or more second actuators.

In the command process, when there is a shortage of control amount with respect to the required control amount with only a first maximum control amount that is a maximum value of a first control amount able to be output by the first actuator, the electronic control unit may be configured to command the first maximum control amount to the first actuator, and command, to one of the one or more second actuators, a second control amount for compensating the shortage.

The suspension may be configured as each of a semi-active suspension and a full active suspension. The one or more second actuators may include: a semi-active actuator configured to make damping force generated by a shock absorber of the suspension variable and applied to the semi-active suspension; and a full active actuator applied to the full active suspension. In the command process, when there is a first shortage of control amount with respect to the required control amount with only a first maximum control amount that is a maximum value of a first control amount able to be output by the first actuator, the electronic control unit may be configured to command the first maximum control amount to the first actuator, and command, to the semi-active actuator, a second control amount for compensating the first shortage.

In the command process, when there remains a second shortage of the control amount with respect to the required control amount only by a combination of the first maximum control amount and a second maximum control amount that is a maximum value of the second control amount able to be output by the semi-active actuator, the electronic control unit may be configured to command the second maximum control amount to the semi-active actuator, and command, to the full active actuator, another second control amount for compensating the second shortage.

In the command process, when the required control amount is satisfied with only a first control amount of the first actuator, the electronic control unit may be configured to command all the required control amount to the first actuator and not to give a command to the one or more second actuators regarding the required control amount.

A method according to the present disclosure is a method of controlling a vehicle suspension that includes a first actuator configured to control a suspension stroke for a control target wheel; and one or more second actuators configured to control the suspension stroke and more responsive than the first actuator. The method includes: calculating a required control amount for at least one of roll control and pitch control of the vehicle; and distributing and commanding the required control amount to the first actuator and the one or more second actuators.

According to the vehicle and the method of controlling a vehicle suspension of the present disclosure, in order to achieve a required control amount for at least one of the roll control and the pitch control, the first actuator and the one or more second actuators having different responsiveness to each other are used in combination. This makes it possible to perform at least one of the roll control and the pitch control while achieving both the responsiveness and other requirements such as energy saving.

DETAILED DESCRIPTION

Figure 1:
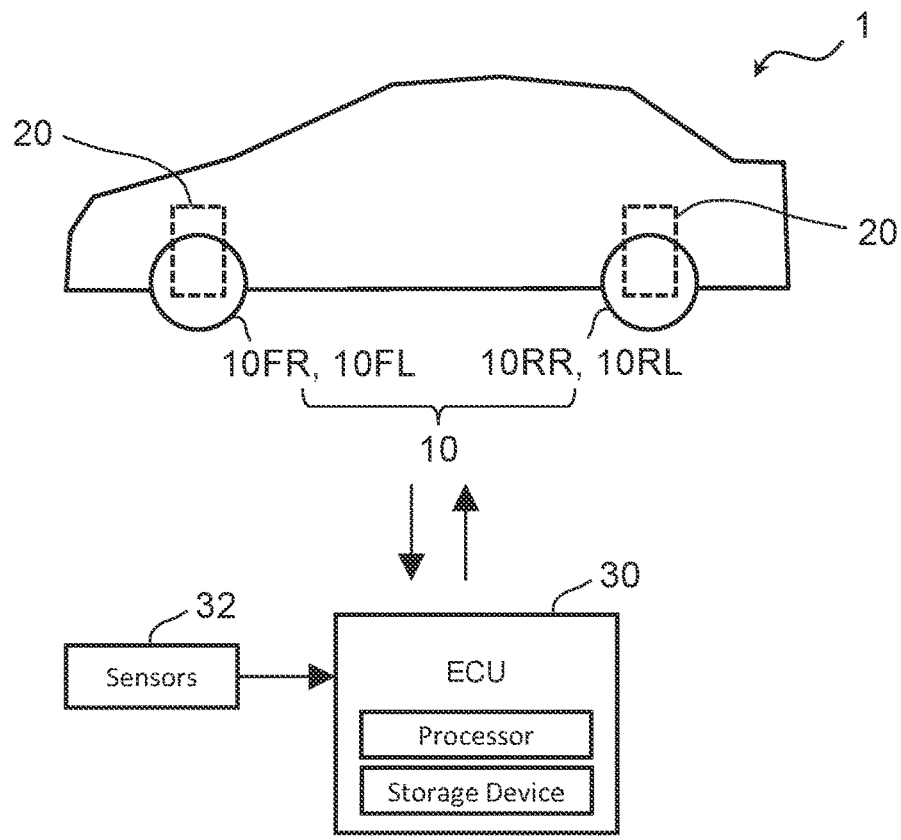
FIG. 1 is a diagram schematically showing an example of a configuration of a vehicle according to a first embodiment.

In the following embodiments of the present disclosure, the same components in the drawings are denoted by the same reference numerals, and redundant descriptions thereof are omitted or simplified. Moreover, it is to be understood that even when the number, quantity, amount, range or other numerical attribute of an element is mentioned in the following description of the embodiments, the present disclosure is not limited to the mentioned numerical attribute unless explicitly described otherwise, or unless the present disclosure is explicitly specified by the numerical attribute theoretically.

1. First Embodiment

1-1. Vehicle Configuration

FIG. 1 is a diagram schematically showing an example of a configuration of a vehicle 1 according to a first embodiment. The vehicle 1 includes four wheels 10 (i.e., left front wheel 10FL, right front wheel 10FR, left rear wheel 10RL, and right rear wheel 10RR). The vehicle 1 also includes an independent suspension 20.

Figure 2:
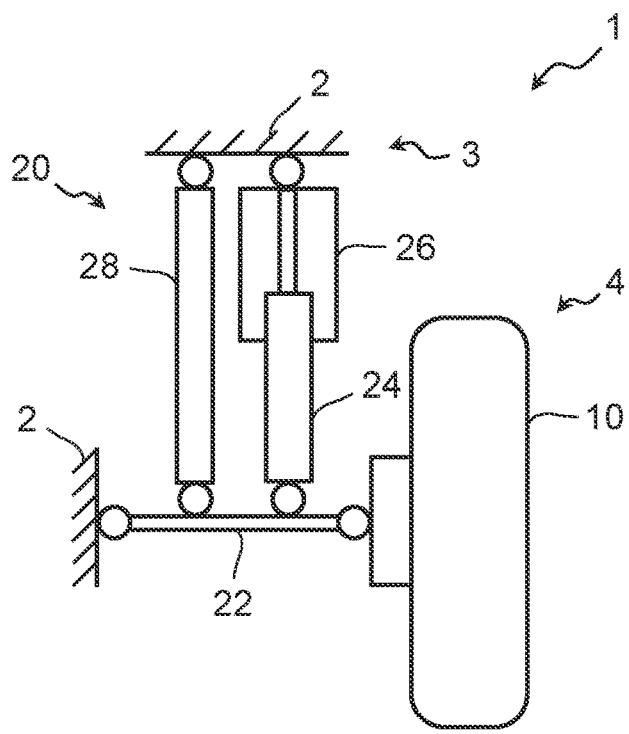
FIG. 2 is a diagram schematically showing an example of a configuration of a suspension shown in FIG. 1.

FIG. 2 is a diagram schematically showing an example of a configuration of the suspension 20 shown in FIG. 1. The suspension 20 suspends each wheel 10 from a vehicle body 2, and includes a suspension arm 22, a shock absorber 24, an air spring 26, and an active actuator 28 for each wheel 10. The suspension arm 22 connects the wheel 10 and the vehicle body 2. The shock absorber 24 and the air spring 26 are interposed between the suspension arm 22 and the vehicle body 2. The components of the vehicle 1, such as the vehicle body 2 and the shock absorber 24, include a part on the vehicle body 2 side of the air spring 26, which corresponds to a sprung component 3. In contrast, the components of the vehicle 1, such as the vehicle body 2 and the shock absorber 24, include a part on the wheel 10 side of the air spring 26, which corresponds to an unsprung component 4.

The air spring 26 is provided with an air pump installed on the vehicle body 2. The air pump is an electric type, for example. The pressure of the compressed air supplied to the inside of the air spring 26 is controlled by an ECU 30 described below. According to the air spring 26, control force F1 according to the air pressure inside the air spring 26 can be generated as one of the control forces F that act between the sprung component 3 and the unsprung component 4. Then, by adjusting this air pressure to control the control force F1, the stroke S of the suspension 20 can be adjusted. The suspension 20 including the air spring 26 is configured as an air suspension. It should be noted that the air spring 26 corresponds to an example of the "first actuator" according to the present disclosure, and is hereinafter also referred to as a "first actuator 26".

As an example, the active actuator 28 is arranged in parallel with the shock absorber 24 and the air spring 26, and interposed between the suspension arm 22 and the vehicle body 2. The active actuator 28 is, for example, an electric type or hydraulic type, and is configured to generate a control force F2, which is another one of the control forces F that act between the sprung component 3 and the unsprung component 4, based on a command from the ECU 30. By controlling this control force F2, the stroke S can be adjusted. The suspension 20 is configured as an active suspension (more specifically, a full active suspension) by including the active actuator 28. That is, the active actuator 28 is applied to the full active suspension. It should be noted that the active actuator 28 corresponds to an example of the "one or more second actuators" and the "full active actuator" according to the present disclosure, and is hereinafter also referred to as a "second actuator 28".

Furthermore, the vehicle 1 is provided with an electronic control unit (ECU) 30. The ECU 30 includes a processor, a storage device, and an input/output interface. The input/output interface receives sensor signals from sensors 32 attached to the vehicle 1, and outputs operation signals to the first actuator 26 and the second actuator 28. Various control programs for controlling the actuators 26 and 28 are stored in the storage device. The processor reads and executes a control program from the storage device, thereby realizing control of the "air suspension" and the "active suspension" using the actuators 26 and 28.

For example, the sensors 32 include: acceleration sensors that are respectively configured to detect lateral acceleration and longitudinal acceleration acting on the vehicle 1; a sprung mass acceleration sensor configured to detect a vertical acceleration of the sprung component 3; a suspension stroke sensor; and a wheel speed sensor provided on each of the wheels 10. Also, for example, the sensors 32 include: an accelerator position sensor and a brake position sensor that are respectively configured to detect the amount of depression of an accelerator pedal and a brake pedal of the vehicle 1; and a steering angle sensor of a steering wheel of the vehicle 1.

1-2. Vehicle Posture Control

The first actuator (air spring) 26 described above corresponds to a suspension spring that cushions the impact from the road surface, and can also adjust the height of the vehicle 1 by controlling the stroke S. Therefore, the first actuator 26 corresponds to an example of a so-called "vehicle height adjustment device". The vehicle height adjustment by this kind of vehicle height adjustment device is performed for the purpose of, for example, lowering the vehicle height to facilitate passengers getting on and off, or lowering the vehicle height to reduce air resistance when the vehicle speed becomes high.

On the other hand, according to the second actuator (active actuator) 28, full active control can be performed. Specifically, the second actuator 28 can be used for vibration control to improve the ride comfort by reducing vertical vibration of the sprung component 3 caused by input from the road surface. The second actuator 28 can also be used for posture control of the vehicle 1 (more specifically, roll control at the time of turning due to steering of the vehicle 1, and pitch control at the time of acceleration and deceleration of the vehicle 1).

The responsiveness of the actuators 26 and 28, both of which can adjust the strokes S, differs due to their basic intended use. Specifically, the purpose of use of the first actuator 26 as the vehicle height adjustment device is as described above. Therefore, the first actuator 26 is not required to have high responsiveness with respect to the adjustment of the stroke S. On the other hand, the second actuator 28 is configured to satisfy high responsiveness because the purpose of use is control that requires high responsiveness such as the vibration control and the posture control described above.

Accordingly, the responsiveness of the second actuator 28 is higher than that of the first actuator 26. On the other hand, the second actuator 28, which is a full active actuator is not energy efficient because it basically continues to consume energy during the execution of the posture control. Therefore, when performing the posture control (more specifically, control of the roll angle and pitch angle) using only the second actuator 28, it is easy to ensure a high control response, but the energy consumption is increased. Here, the first actuator 26 as the vehicle height adjustment device can also be used for the posture control because it can also adjust the stroke S. However, it is difficult to always satisfy the responsiveness required for the posture control by using only the first actuator 26.

Therefore, in the first embodiment, the ECU 30 is configured to execute the following "calculation process" and "command process" while using the first and second actuators 26 and 28 together for the posture control. That is, the ECU 30 executes the calculation process to calculate a required control amount X for achieving the roll control and pitch control of the vehicle 1. Then, the ECU 30 executes the command process to distribute and command the calculated required control amount X to the first actuator 26 and the second actuator 28.

To be more specific, according to the first embodiment, in the command process, when there is a shortage of the control amount with respect to the required control amount X with only a first maximum control amount X1max that is the maximum value of a first control amount X1 that is able to be output by the first actuator 26, the ECU 30 commands the first maximum control amount X1max to the first actuator 26, and commands, to the second actuator 28, a second control amount X2 for compensating the shortage.

On the other hand, when the required control amount X is satisfied with only the first control amount X1, the ECU 30 commands all the required control amount X to the first actuator 26 as the first control amount X1, and does not give a command to the second actuator 28 regarding the required control amount X.

Figure 3:
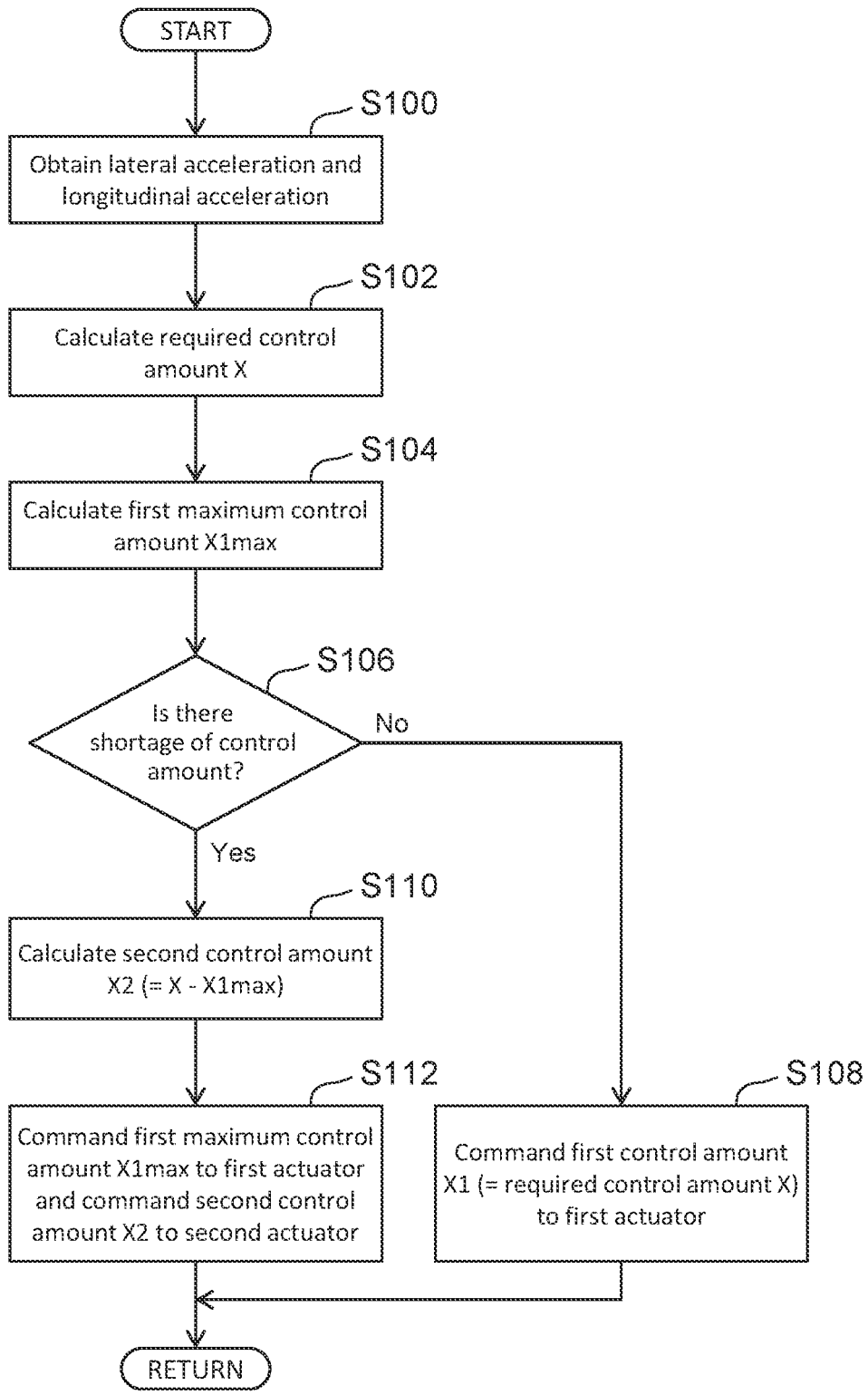
FIG. 3 is a flowchart showing an example of processing relating to posture control according to the first embodiment.

FIG. 3 is a flowchart showing an example of processing relating to the posture control according to the first embodiment. The processing of this flowchart is repeatedly executed for each predetermined time step Δt (see FIG. 5) during the travel of the vehicle 1. It should be noted that, in FIG. 3, the processing of steps S100 and S102 corresponds to an example of the "calculation process" described above, and the processing of steps S104-S112 corresponds to an example of the "command process" described above.

<Step S100>

In FIG. 3, first, in step S100, the ECU 30 obtains the lateral acceleration and longitudinal acceleration that act on the vehicle 1. More specifically, in order to calculate a required control amount X in the following step S102, the ECU 30 estimates the lateral acceleration and the longitudinal acceleration at the next sample time (k+1) of the current sample time (k), for example. The method of this estimation is not particularly limited. For example, the lateral acceleration may be estimated based on information such as vehicle speed and steering angle. The longitudinal acceleration may be estimated, for example, based on the required information on vehicle front-rear force (for example, required engine torque or required braking force). Moreover, the lateral acceleration and longitudinal acceleration may be estimated using, for example, the sprung mass acceleration sensor included in the sensors 32. Furthermore, in an example in which the vehicle 1 is an automated driving vehicle, the ECU 30 may receive information on future lateral acceleration and longitudinal acceleration from information obtained for path planning.

<Step S102>

Then, in step S102, the ECU 30 calculates a required control amount X for the roll control and the pitch control. The roll control mentioned here is a control to generate control force F1, F2 of one or both of the actuators 26 and 28 such that the roll generated at the time of turning caused by the steering of the vehicle 1 is canceled. More specifically, "cancelling a roll" means reducing the roll generated as compared with an example without the roll control, or generating a roll in the opposite direction to the generated roll. Similarly, the pitch control mentioned here is a control to generate control force F1, F2 of one or both of the actuators 26 and 28 such that the pitch generated at the time of acceleration and deceleration of the vehicle 1 is canceled. More specifically, "canceling a pitch" means reducing the pitch generated as compared with an example without the pitch control, or generating a pitch in the opposite direction to the generated pitch.

Accordingly, when both the roll control and the pitch control are performed, the required control amount X is the sum of a required control amount Xr for the roll control and a required control amount Xp for the pitch control. The required control amount Xr corresponds to a required value of the control force F for the roll control. The required control amount Xp corresponds to a required value of the control force F for the pitch control.

In step S102, the ECU 30 calculates each of the required control amounts Xr and Xp for each wheel 10. Then, the ECU 30 calculates the sum of the calculated required control amounts Xr and Xp for each wheel 10 as the required control amount X.

Additionally, in each wheel 10, the control force F (F1 and F2), which is the suspension generating force, is positive when acting to lift the vehicle body 2 upward. Along with this, the required control amount X (Xr and Xp) also becomes positive when acting to lift the vehicle body 2 upward. Therefore, the required control amount Xr becomes positive for the wheels 10 on the outside of the turn, and becomes negative for the wheels 10 on the inside of the turn. Similarly, at the time of acceleration, the required control amount Xp becomes negative for the front wheels 10FL and 10FR and becomes positive for the rear wheels 10RL and 10RR. Conversely, at the time of deceleration, the required control amount Xp becomes positive for the front wheels 10FL and 10FR and becomes negative for the rear wheels 10RL and 10RR.

Figure 4A:
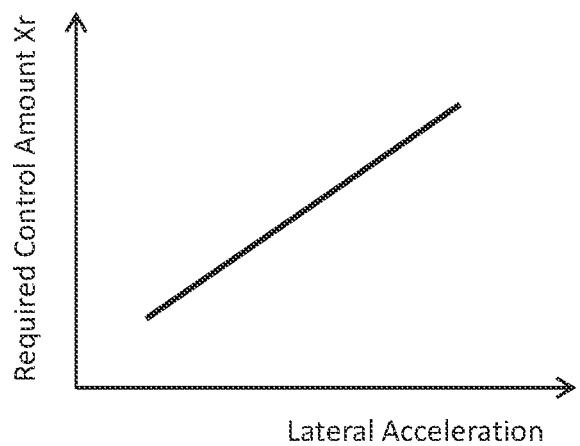
FIG. 4A is a diagram used to describe an example of method of calculating a required control amount Xr for roll control.
Figure 4B:
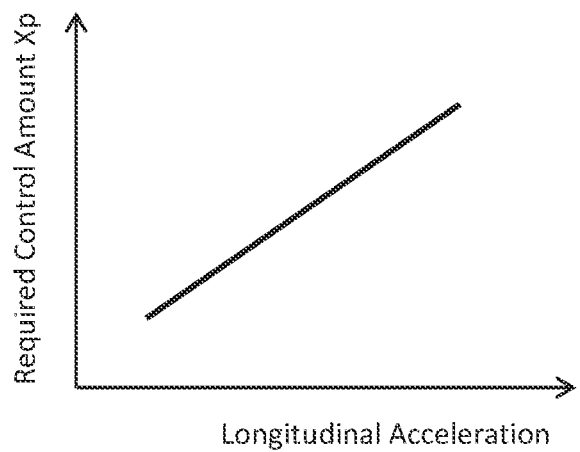
FIG. 4B is a diagram used to describe an example of method of calculating a required control amount Xp for pitch control.

FIGS. 4A and 4B are diagrams used to describe examples of the method of calculating the required control amount Xr for the roll control and the required control amount Xp for the pitch control, respectively. In step S102, the ECU 30 calculates the required control amount X r at the next sample time (k+1). The required control amount Xr is calculated by multiplying the lateral acceleration obtained in step S100 by a proportional coefficient (gain). Therefore, as shown in FIG. 4A, when the absolute value of the lateral acceleration increases, the absolute value of the required control amount Xr also increases. This proportional coefficient corresponds to the slope of the straight line shown in FIG. 4A, and is, for example, a predetermined value.

Also, the ECU 30 calculates the required control amount X p at the next sample time (k+1). Similarly, the required control amount Xp is calculated by multiplying the longitudinal acceleration obtained in step S100 by a proportional coefficient (gain). Therefore, as shown in FIG. 4B, when the absolute value of the longitudinal acceleration increases, the absolute value of the required control amount Xp also increases. This proportional coefficient corresponds to the slope of the straight line shown in FIG. 4B, and is, for example, a predetermined value.

Additionally, the method of calculating the required control amount X is not particularly limited, and the required control amount X does not need to be based on the lateral acceleration and the longitudinal acceleration as obtained in step S100. Namely, the required control amount X that is distributed and commanded in the "command process" according to the present disclosure may be one that can be used in at least one of the roll control and the pitch control. For this reason, the required control amount X may be calculated, for example, from virtual roll/pitch dynamic characteristics (e.g., spring constant and damping coefficient), or may be calculated based on other control laws or control theories.

<Step S104>

Next, in step S104, the ECU 30 calculates a first maximum control amount X1max that can be output by the first actuator (air spring) 26. More specifically, the first maximum control amount X1max corresponds to the maximum value of the first control amount X1 that can be output by the first actuator 26, including when the first control amount X1 changes with the passage of time. In step S104, the ECU 30 calculates a first maximum control amount X1max that can be output at the next sample time (k+1).

Here, the maximum change speed V1max and maximum value F1max of the control force F1 that can be output by the first actuator 26 (see FIG. 5) are basically determined by the specifications of the first actuator 26. Therefore, the maximum change speed V1max and the maximum value F1max can be obtained in advance. The storage device of the ECU 30 stores information on the basic operating characteristics of the first actuator 26, such as the maximum change speed V1max and the maximum value F1max. More specifically, the maximum change speed V1max corresponds to the maximum change amount ΔF1max (see FIG. 5) per unit time (per time step Δt).

Figure 5:
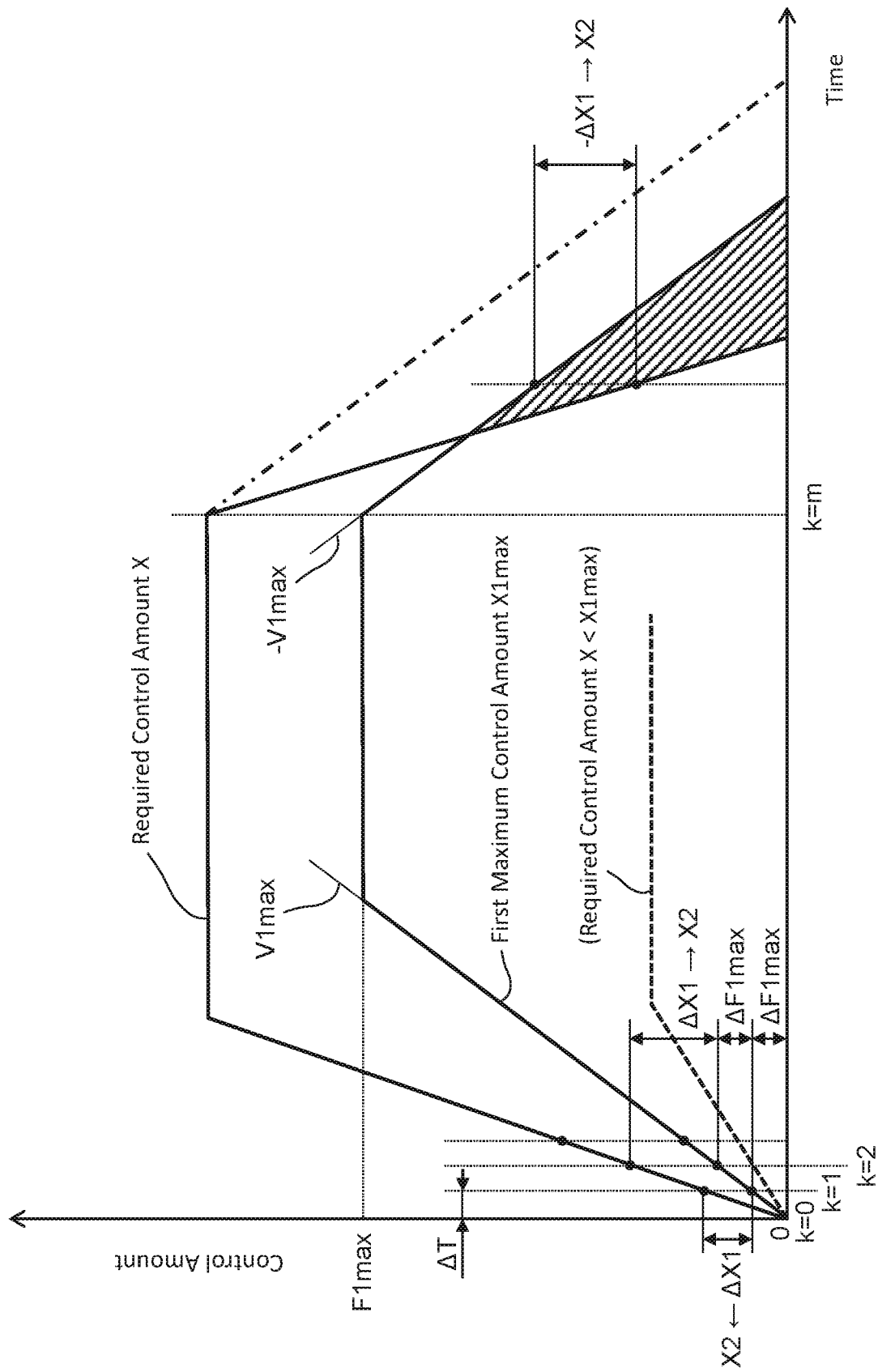
FIG. 5 is a time chart schematically showing a relationship among a required control amount X, a first maximum control amount X1max, and a second control amount X2.

FIG. 5 is a time chart schematically showing a relationship among the required control amount X, the first maximum control amount X1max, and the second control amount X2. In FIG. 5, the turning time associated with the steering of the vehicle 1 is exemplified, but, for the sake of simplification of the explanation, it is assumed that a change in the longitudinal acceleration caused by the acceleration and deceleration of the vehicle 1 does not occur. That is, in FIG. 5, the required control amount Xp is treated as zero. Therefore, the required control amount Xr is equal to the required control amount X. Moreover, the relationship represented in FIG. 5 is with the wheel 10 which is on the outside of the turn when the vehicle 1 turns. In the relationship of the wheel 10 which is inside the turn when the vehicle 1 turns, the sign of the required control amount X and the first maximum control amount X1max is opposite to the sign in the relationship shown in FIG. 5.

Additionally, when the longitudinal acceleration changes at the time of turning, the waveform of the required control amount X shown in FIG. 5 also changes due to the change in the required control amount Xp. However, the calculation of the first maximum control amount X1max and the following second control amount X2 can be performed in the same manner as in the example shown in FIG. 5 even when the longitudinal acceleration changes regardless of the presence or absence of turning.

In the example shown in FIG. 5, in response to the start of steering at the sample time (k=0), the lateral acceleration increases with the lapse of time, and the required control amount X increases accordingly. Also, in this example, after that, a steady circular turning state is established in which the vehicle speed and lateral acceleration are constant, and the required control amount X is constant with respect to the lapse of time. More specifically, FIG. 5 shows the required control amount X (solid line and broken line) in two ways of turning in which the lateral acceleration generated at the time of turning is different.

The first maximum control amount X1max of the first actuator 26 at each sample time k can be calculated based on, for example, the maximum change speed V1max and the maximum value F1max described above. Specifically, as shown in FIG. 5, first, the first maximum control amount X1max at the sample time (k=0) is zero. The first maximum control amount X1max at the next sample time (k=1) is calculated as the maximum change amount ΔF1max which is the product of the maximum change speed V1max stored in the storage device and the time step Δt. The first maximum control amount X1max at each sample time k during a period from the next sample time (k=2) until the first maximum control amount X1max reaches the maximum value F1max is calculated by adding the maximum change amount ΔF1max to the previous value. The first maximum control amount X1max after the first maximum control amount X1max reaches the maximum value F1max is calculated as the maximum value F1max. In addition, when the first maximum control amount X1max calculated in this manner is compared with the required control amount X of the solid line, the time waveform of the first maximum control amount X1max corresponds to a time waveform obtained by limiting the rate of change in the waveform of the required control amount X by the maximum change speed V1max and limiting the upper limit by the maximum value F1max.

Furthermore, in the example shown in FIG. 5, the required control amount X decreases toward zero after remaining constant with respect to the lapse of time. In order to achieve the required control amount X that changes in this manner, it is necessary to reduce the first control amount X1 with the lapse of time. The maximum change speed obtained when the first control amount X1 is reduced (i.e., the slope of the time waveform of the first maximum control amount X1max) is a V1max (negative value). Therefore, when, for example, first control amount X1 is decreased from the sample time (k=m), the first maximum control amount X1max at the sample time k can be calculated by subtracting a negative maximum change amount ΔF1max from the previous value, similarly to when the required control amount X increases.

Additionally, the information on the basic operating characteristics of the first actuator 26 stored in the storage device for calculating the first maximum control amount X1max may include information on dynamic characteristics such as a dead-time characteristics and first-order delay characteristics. Then, the first maximum control amount X1max may be calculated, for example, in consideration of one or both of the dead-time characteristics and the first-order delay characteristics.

<Step S106>

Next, in step S106, the ECU 30 determines whether or not there is a shortage of the control amount with respect to the required control amount X with only the first maximum control amount X1max that is able to be output by the first actuator 26. This determination can be made, for example, based on whether a difference ΔX1 is not zero. The difference ΔX1 is a value (=X−X1max) obtained by subtracting the first maximum control amount X1max calculated in step S104 from the required control amount X calculated in step S102.

More specifically, when the required control amount X increases with the lapse of time as illustrated in FIG. 5, the difference ΔX1 is positive because the required control amount X is greater than the first maximum control amount X1max. Also, as illustrated in FIG. 5, the difference ΔX1 is also positive when the required control amount X that remains constant is greater than the first maximum control amount X1max (more specifically, the maximum value F1max). As described above, the fact that the difference ΔX1 is positive means that the control amount is insufficient with only the first maximum control amount X1max.

Moreover, "the shortage of the control amount" determined in step S106 also occurs when the difference ΔX1 becomes negative, as in a hatched area shown in FIG. 5. This hatched area is caused, for example, due to the fact that the slope (solid line) of the required control amount X decreasing in response to a sudden return operation of the steering wheel by the driver of the vehicle 1 becomes greater than the slope of the first maximum control amount X1max. In this hatched area, the first maximum control amount X1max at each sample time k is greater than the required control amount X. That is, the difference ΔX1 becomes negative.

<Step S108>

When the determination result of step S106 is No, that is, when there is no shortage of the control amount, the processing proceeds to step S108. For example, when the required control amount X is as represented by the broken line in FIG. 5, this determination result is No. In step S108, the ECU 30 commands, to the first actuator 26, the first control amount X1 equal to the required control amount X calculated in step S102. As a result, the first actuator 26 is controlled to generate a control force F1 according to the commanded required control amount X.

<Step S110>

On the other hand, when the determination result of step S106 is YES, that is, when there is a shortage of the control amount, the processing proceeds to step S110. For example, when the required control amount X is as represented by the solid line in FIG. 5, this determination result is Yes.

In step S110, the ECU 30 calculates a second control amount X2 that is the control amount of the second actuator (active actuator) 28. More specifically, the ECU 30 calculates the second control amount X2 at the next sample time (k+1). The second control amount X2 is calculated as a value necessary to compensate "the shortage of the control amount".

More specifically, the second control amount X2 is a value obtained by subtracting the first maximum control amount X1max calculated in step S104 from the required control amount X calculated in step S102, that is, the difference ΔX1. The reason is that, as illustrated in FIG. 5, when the difference ΔX1 is positive, it is necessary to increase the control force F2 of the second actuator 28 by the amount corresponding to the shortage (i.e., difference ΔX1) generated when only the first maximum control amount X1max in the required control amount X is used. When, on the other hand, the difference ΔX1 is negative, if only the first maximum control amount X1max is used, the control amount is insufficient by the negative difference ΔX1. Therefore, it is necessary to control the control force F2 of the second actuator 28 so as to decrease by the negative difference ΔX1.

<Step S112>

In step S112 following step S110, the ECU 30 commands the first maximum control amount X1max calculated in step S104 to the first actuator 26 as the first control amount X1, and commands the second control amount X2 calculated in step S110 to the second actuator 28. As a result, the first actuator 26 is controlled to generate a control force F1 according to the commanded first maximum control amount X1max. Also, the second actuator 28 is controlled to generate a control force F2 according to the commanded second control amount X2.

Additionally, in the example shown in FIG. 5, when the slope of the required control amount X that starts to decrease from the sample time (k=m) is the same (dashed line) as or smaller than the slope of the first maximum control amount X1max, the second control amount X2 is reduced to zero with the lapse of time from the sample time (k=m) during the period in which the required control amount X is greater than the first maximum control amount X1max. As a result, it is possible to satisfy the required control amount X with only the first control amount X1 thereafter.

1-3. Effect

As described above, the second actuator 28 has higher responsiveness but consumes more energy than the first actuator 26. According to the vehicle 1 of the first embodiment described above, the required control amount X for the roll control and the pitch control is calculated. Then, the calculated required control amount X is distributed and commanded to the first actuator 26 and the second actuator 28. In this way, the first and second actuators 26 and 28 having different responsiveness are used in combination to achieve the required control amount X. This makes it possible to perform the roll control and the pitch control while achieving both responsiveness and other requirements (in the example of the active actuator 28, energy saving). Therefore, the comfort of the vehicle 1 can be improved.

More specifically, according to the vehicle 1 of the first embodiment, in the command process, when there is a shortage of the control amount with respect to the required control amount X with only the first maximum control amount X1max that can be output by the first actuator 26, the first maximum control amount X1max is commanded to the first actuator 26, and the second control amount X2 for compensating the shortage is commanded to the second actuator 28. As a result, it is possible to compensate the control amount for achieving the required control amount X by using the second actuator 28 as needed, while using the first actuator 26 as a main actuator for the roll control and the pitch control. In addition, by using the highly responsive second actuator 28 as a sub actuator, the response delay of the first actuator 26 can be compensated when the required control amount X changes transiently (more specifically, when the required control amount X increases or decreases). As a result, at the time of transient, the total control amount of the two actuators 26 and 28 can be suitably brought close to the required control amount X.

Moreover, according to the vehicle 1 of the first embodiment, when the required control amount X can be satisfied with only the first control amount X1, all the required control amount X is commanded to the first actuator 26 as the first control amount X1, and no command is given to the second actuator 28 regarding the required control amount X. As a result, it is possible to reduce the frequency of use of the second actuator 28, which consumes a larger amount of energy, while satisfying the required control amount X.

Furthermore, by using two types of actuators 26 and 28, the maximum control amounts that can output by the individual actuators 26 and 28 can be used as needed. As a result, in the roll control and the pitch control, it becomes possible to achieve a required control amount X of a size that cannot be satisfied by using only one of the actuators 26 and 28. Therefore, the comfort of the vehicle 1 can be improved.

Additionally, in the first embodiment described above, the active actuator (more specifically, the full active actuator) 28 is used as the "second actuator" according to the present disclosure. However, for example, an actuator of an active stabilizer device or a semi-active actuator 44 described in the following second embodiment may be used as the "second actuator" instead of the active actuator 28, although the control force F that can be generated is limited.

2. Second Embodiment

A vehicle 5 according to a second embodiment is different from the vehicle 1 according to the first embodiment in the points described below.

2-1. Vehicle Configuration

Figure 6:
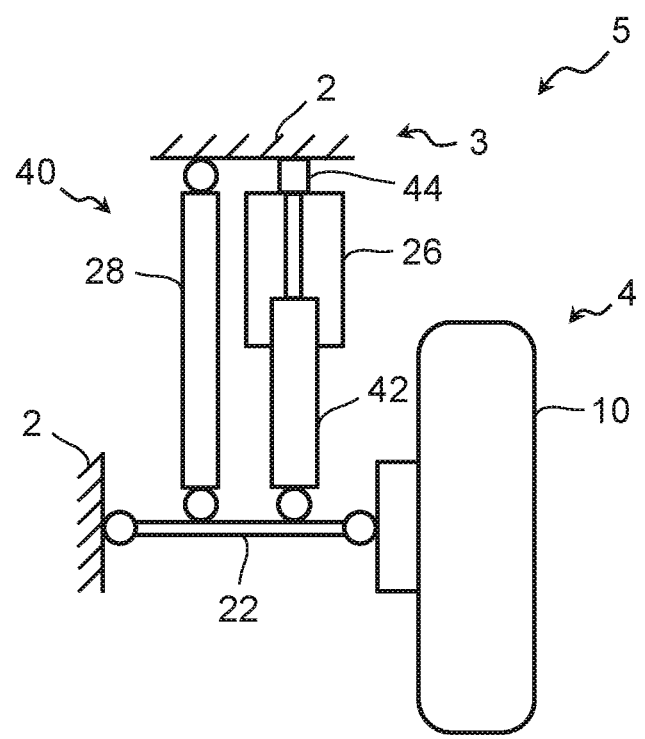
FIG. 6 is a diagram schematically showing an example of a configuration of a suspension of a vehicle according to a second embodiment.

FIG. 6 is a diagram schematically showing an example of a configuration of a suspension 40 of the vehicle 5 according to the second embodiment. The vehicle 5 is provided with the suspension 40. The suspension 40 is different from the suspension 20 according to the first embodiment, except that the suspension 40 includes a variable damping force shock absorber 42 instead of the shock absorber 24.

The variable damping force shock absorber 42 includes an actuator 44 which makes the damping force generated by the shock absorber 42 of the vehicle 5 variable. The suspension 40 is configured as a semi-active suspension by including the actuator 44. That is, the actuator 44 is applied to the semi-active suspension. This damping force corresponds to a control force F3 generated by the shock absorber 42 so as to act between the sprung component 3 and the unsprung component 4. More specifically, the control force F3 (damping force) controlled by the actuator 44 is the resistance force to the expansion or contraction of the shock absorber 42. Therefore, the conditions under which the damping force can be generated are limited when the speed of the stroke S (i.e., stoke speed VS) is changing (more specifically, for example, when the required control amount X is increasing or decreasing). Accordingly, the active control (more specifically, the semi-active control) by the actuator 44 is limited as compared with the full active control by the second actuator 28. It should be noted that the actuator 44 corresponds to an example of each of the "second actuator" and the "semi-active actuator" according to the present disclosure.

2-2. Vehicle Posture Control

As described above, the vehicle 5 according to the second embodiment includes two second actuators 28 and 44, that is, the full active actuator 28 and the semi-active actuator 44. That is, the suspension 40 is configured as each of the full active suspension and the semi-active suspension. Similarly to the second actuator 28, the second actuator 44 is higher in responsiveness than the first actuator (air spring) 26. Also, the second actuator (semi-active actuator) 44 configured to generate a control force F3 as the damping force has less energy consumption than the second actuator (full active actuator) 28.

Accordingly, in the second embodiment, the ECU 30 uses the first actuator 26 and the second actuators 28 and 44 for the posture control (roll control and pitch control) as follows. That is, in the command process, when there is a shortage of the control amount with respect to the required control amount X (hereinafter, for convenience, referred to as "first shortage") with only the first maximum control amount X1max that can be output by the first actuator 26, the ECU 30 commands the first maximum control amount X1max to the first actuator 26, and commands, to the semi-active actuator 44 that is one of the second actuators, a second control amount X21 for compensating the first shortage.

Moreover, in the second embodiment, in the command process, when there remains a shortage of the control amount with respect to the required control amount X (hereinafter, for convenience, referred to as "second shortage") only by the combination of the first maximum control amount X1max and a second maximum control amount X21max that is the maximum value of the second control amount X21 that can be output by the semi-active actuator 44, the ECU 30 commands the second maximum control amount X21max to the semi-active actuator 44 that is one of the second actuators, and commands, to the full active actuator 28 that is the other second actuator, a second control amount X22 that is another second control amount for compensating the second shortage.

When, on the other hand, the required control amount X can be satisfied with only the first control amount X1, the ECU 30 commands all the required control amount X to the first actuator 26 as the first control amount X1, and does not give a command to the second actuators 28 and 44 regarding the required control amount X. In addition, when there is a first shortage and the required control amount X can be satisfied by the combination of the first maximum control amount X1max and the second control amount X21, the ECU 30 distributes and commands all the required control amount X to the first actuator 26 and the second actuator 44, and does not give a command to the other second actuator 28 regarding the required control amount X.

Figure 7:
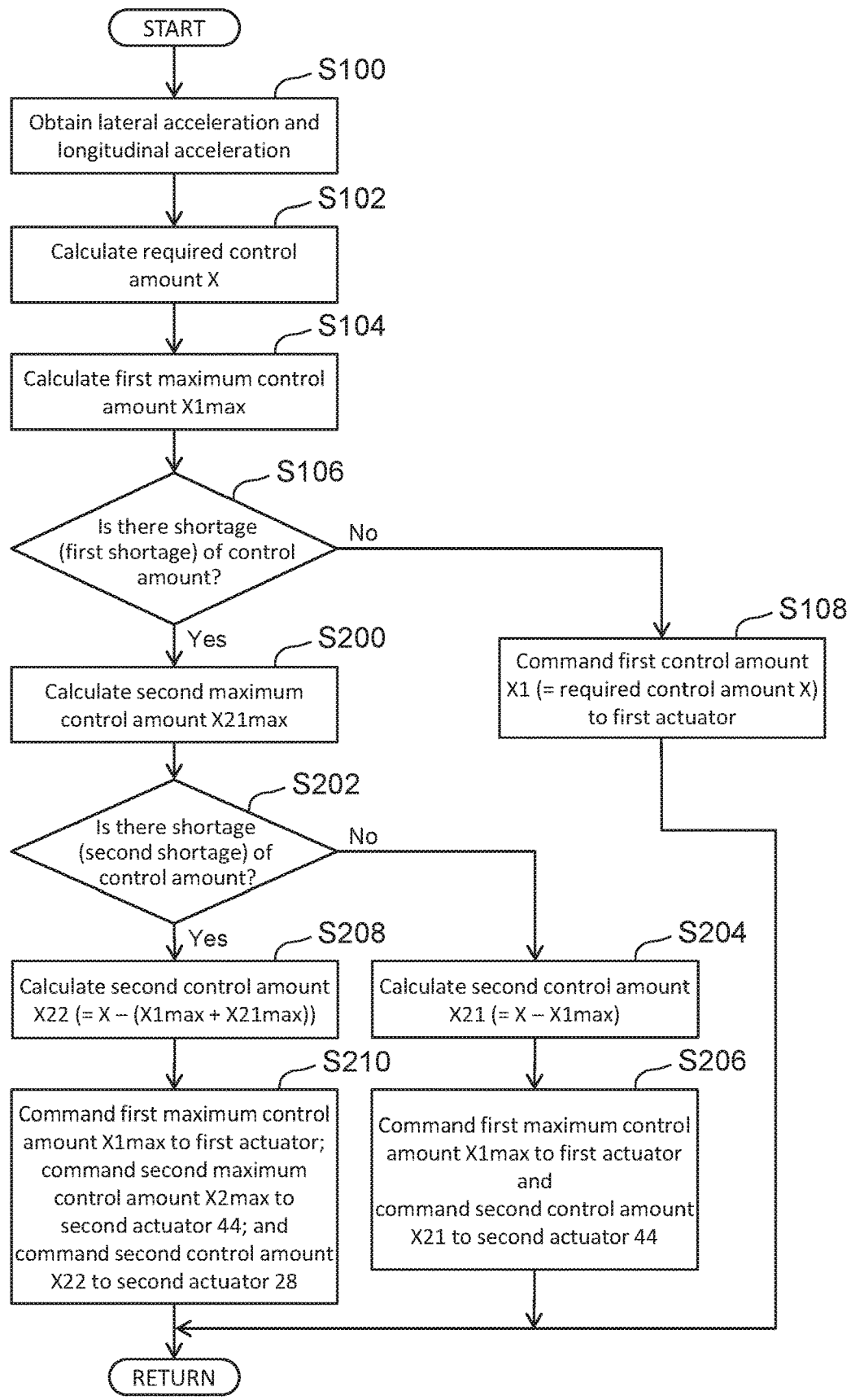
FIG. 7 is a flowchart showing an example of processing relating to posture control according to the second embodiment.
Figure 8:
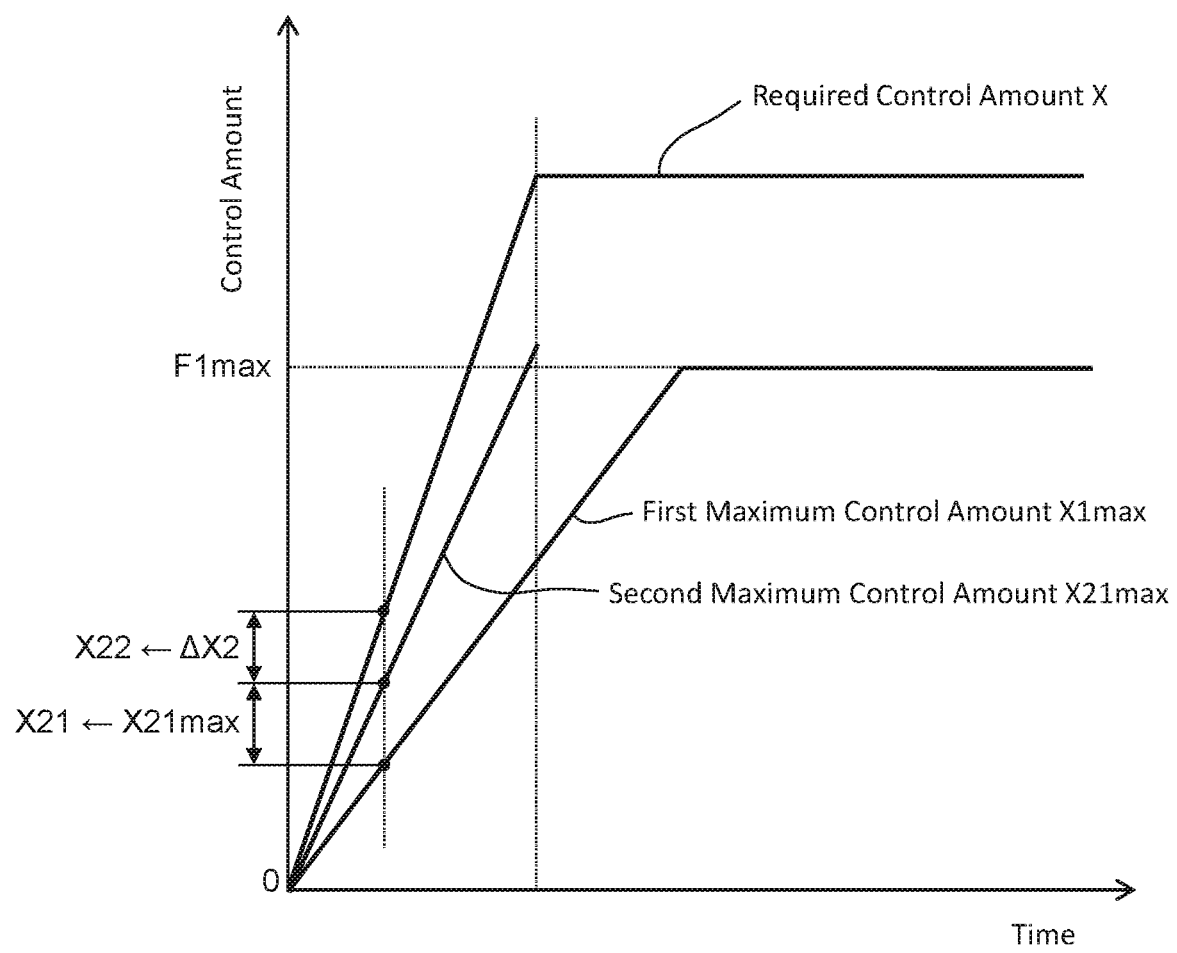
FIG. 8 is a time chart schematically showing a relationship among the required control amount X, the first maximum control amount X1max, a second maximum control amount X21max, and a second control amount X22.

FIG. 7 is a flowchart showing an example of processing relating to the posture control according to the second embodiment. The processing of this flowchart is different from the processing of the flowchart shown in FIG. 3 in that the processing of the following steps S200 to S210 is executed instead of the processing of steps S110 and S112. That is, in FIG. 7, the processing of steps S104-S108, and S200 to S210 corresponds to an example of the "command process". Also, FIG. 8 is a time chart schematically showing a relationship among the required control amount X, the first maximum control amount X1max, the second maximum control amount X21max, and the second control amount X22. In FIG. 8, similarly to FIG. 5, the operation at the time of turning is exemplified.

<Step S200>

In FIG. 7, when the determination result of step S106 is YES (that is, when there is a "first shortage"), the processing proceeds to step S200.

In step S200, the ECU 30 calculates the second maximum control amount X21max that can be output by the second actuator (semi-active actuator) 44. More specifically, in step S104, the ECU 30 calculates the second maximum control amount X21max that can be output at the next sample time (k+1).

As described above, the control force F3 (damping force) of the shock absorber 42 controlled by the second actuator 44 can be generated when the stroke speed VS is changing. Also, the magnitude of this control force F3 (damping force) varies according to the stroke speed VS. Therefore, the relationship between the maximum control force F3max and the stroke speed VS in the condition that the second actuator 44 is controlled such that the control force F3 is maximized can be obtained in advance. The storage device of the ECU 30 stores the relationship as a map. For example, the ECU 30 calculates the maximum control force F3max according to the stroke speed VS at the next sample time (k+1) from this map, and uses the maximum control force F3max as the second maximum control amount X21max at the next sample time (k+1). In addition, when the stroke speed VS at the next sample time (k+1) is zero, the second maximum control amount X21max is calculated as zero.

Additionally, the stroke speed VS at the next sample time (k+1) can be estimated using, for example, the time series data of the sensor value of the suspension stroke sensor. Also, for the calculation of the second maximum control amount X21max at each sample time k, for example, the response characteristics of the second actuator 44 for obtaining the maximum control force F3max may be taken into consideration.

<Step S202>

In step S202 following step S200, the ECU 30 determines whether or not there remains a "second shortage" of the control amount with respect to the required control amount X only by a combination of the first maximum control amount X1max and the second maximum control amount X21max. Specifically, this determination can be performed based on, for example, whether the difference ΔX2 (=X−(X1max+X21max)) obtained by subtracting the sum of the first maximum control amount X1ax and the second maximum control amount X21max from the required control amount X is not zero.

More specifically, FIG. 8 shows an example in which the second shortage occurs when the required control amount X increases with the lapse of time. In the example shown in FIG. 8, the difference AX2 is positive, and the second shortage occurs. It should be noted that, although not shown in FIG. 8, the second shortage may also occur when the required control amount X drops sharply with the lapse of time, as illustrated in FIG. 5. At this time, the first maximum control amount X1ax becomes greater than the required control amount X, and the second control amount X21 becomes a negative value (second maximum control amount X21max) in order to reduce the first shortage. Also, the difference AX2 becomes negative.

<Steps S204 and S206>

When the determination result of step S202 is No (that is, when, although the first shortage occurs, the second shortage does not remain because the required control amount X can be satisfied by the combination of the first maximum control amount X1max and the second maximum control amount X21max), the processing proceeds to step S204.

The processing of steps S204 and S206 is similar to the processing of steps S110 and S112 (see FIG. 3), respectively. That is, in step S204, the ECU 30 calculates the second control amount X21 of the second actuator 44 at the next sample time (k+1). The second control amount X21 is calculated as a value necessary to compensate for the "first shortage". That is, the second control amount X21 is the difference ΔX1 (positive or negative value) described above.

In step S206 following step S204, the ECU 30 commands, to the first actuator 26 as the first control amount X1, the first maximum control amount X1max calculated in step S104, and commands, to the second actuator (semi-active actuator) 44, the second control amount X21 calculated in step S206.

<Step S208>

When, on the other hand, the determination result of step S202 is YES, that is, when there remains the second shortage, the processing proceeds to step S208. In step S208, the ECU 30 calculates the second control amount X22 of the second actuator 28 at the next sample time (k+1). The second control amount X22 is calculated as a value necessary to compensate for the remaining "second shortage". That is, the second control amount X22 is the difference ΔX2 (positive or negative value) described above.

<Step S210>

In step S210 following step S208, the ECU 30 commands, to the first actuator 26 as the first control amount X1, the first maximum control amount X1max calculated in step S104, and commands, to the second actuator (semi-active actuator) 44 as the second control amount X21, the second maximum control amount X21max calculated in step S200. Also, the ECU 30 commands, to the second actuator (full-active actuator) 28, the second control amount X22 calculated in step S208.

2-3. Effect

As described above, according to the vehicle 5 of the second embodiment, when there is a "first shortage" of the control amount with only the first maximum control amount X1max, the first maximum control amount X1max is commanded to the first actuator 26, and the second control amount X21 for compensating the first shortage is commanded to the semi-active actuator 44. That is, according to the second embodiment, in the vehicle 5 including the two second actuators 28 and 44, the semi-active actuator 44, not the full active actuator 28, is actively used to compensate for the lack of responsiveness of the main first actuator 26. As a result, at the time of transition, it is possible to compensate for the lack of responsiveness of the first actuator 26 while reducing the energy consumption. Therefore, both the responsiveness and the energy saving can be more suitably achieved.

Furthermore, according to the vehicle 5 of the second embodiment, when there remains "the second shortage of the control amount" only by the combination of the first maximum control amount X1max and the second maximum control amount X21max, the second control amount X22 for compensating the second shortage is commanded to the full active actuator 28. By using the two second actuators 28 and 44 in this order, the second shortage can be eliminated or at least reduced while giving consideration to reducing energy consumption as much as possible.

3. Other Embodiments

In the first and second embodiments described above, the posture control (roll control and pitch control) is performed for four wheels 10 (i.e., all wheels) of the vehicle 1 or 5. However, the wheel subject to the posture control (i.e., control target wheel) is not necessarily limited to all wheels, and may be, for example, only two front wheels or only two rear wheels.

Moreover, unlike the first and second embodiments described above, the posture control to which the "calculation process" and the "command process" according to the present disclosure are applied may be either the roll control or the pitch control.

Furthermore, with respect to the calculation of the first maximum control amount X1max of the first actuator 26, increasing the maximum value of the first maximum control amount X1max to the maximum value F1max (see FIG. 5) has the following issue. That is, when the required control amount X drops sharply in response to the sudden return operation of the steering wheel as illustrated in FIG. 5, the second actuator 28 is required to generate a control force F2 in the opposite direction to the control force F1 generated by the first actuator 26, in order to achieve the required control amount X (see the hatched area in FIG. 5). This is not good in terms of energy consumption. Accordingly, in order to reduce the occurrence of the control force F2 in the opposite direction to the control force F1, the maximum value of the first maximum control amount X1max may be limited to be smaller than the maximum value F1max.

Additionally, there is a vehicle that can switch the vehicle traveling mode between a "first traveling mode (e.g., sports mode)" that emphasizes driving performance and a "second traveling mode (e.g., comfort mode)" that emphasizes comfort rather than the driving performance. For example, when the first traveling mode is selected by the operation of a mode selector switch by the driver, there is a high possibility that the steering wheel may be operated more frequently or the vehicle may be accelerated or decelerated more frequently than when the second traveling mode is selected. Accordingly, in order to reduce the situation in which the control force F2 is generated in the opposite direction to the control force F1, when the first traveling mode is selected, the ECU 30 may limit the maximum value of the first maximum control amount X1max to be smaller than when the second traveling mode is selected.

What is claimed is:

1. A vehicle comprising:
a first actuator configured to control a stroke of a suspension for a control target wheel;
one or more second actuators configured to control the stroke of the suspension and more responsive than the first actuator; and
an electronic control unit configured to:
execute a calculation process to calculate a required control amount for at least one of roll control and pitch control of the vehicle; and
execute a command process to distribute and command the required control amount to the first actuator and the one or more second actuators,
wherein in the command process, when there is a shortage of control amount with respect to the required control amount with only a first maximum control amount that is a maximum value of a first control amount able to be output by the first actuator, the electronic control unit is configured to command the first maximum control amount to the first actuator, and command, to one of the one or more second actuators, a second control amount for compensating the shortage.

2. The vehicle according to claim 1, wherein
the suspension is configured as each of a semi-active suspension and a full active suspension,
the one or more second actuators include:
a semi-active actuator configured to make damping force generated by a shock absorber of the suspension variable and applied to the semi-active suspension; and
a full active actuator applied to the full active suspension, and
in the command process, when there is a first shortage of control amount with respect to the required control amount with only a first maximum control amount that is a maximum value of a first control amount able to be output by the first actuator, the electronic control unit is configured to command the first maximum control amount to the first actuator, and command, to the semi-active actuator, a second control amount for compensating the first shortage.

3. The vehicle according to claim 2, wherein
in the command process, when there remains a second shortage of the control amount with respect to the required control amount only by a combination of the first maximum control amount and a second maximum control amount that is a maximum value of the second control amount able to be output by the semi-active actuator, the electronic control unit is configured to command the second maximum control amount to the semi-active actuator, and command, to the full active actuator, another second control amount for compensating the second shortage.

4. The vehicle according to claim 1, wherein
in the command process, when the required control amount is satisfied with only a first control amount of the first actuator, the electronic control unit is configured to command all the required control amount to the first actuator and not to give a command to the one or more second actuators regarding the required control amount.

5. A method of controlling a vehicle suspension that includes a first actuator configured to control a suspension stroke for a control target wheel; and one or more second actuators configured to control the suspension stroke and more responsive than the first actuator, the method comprising:
executing a calculation process, by an electronic control unit, to calculate a required control amount for at least one of roll control and pitch control of the vehicle; and
executing a command process, by the electronic control unit, to distribute and command the required control amount to the first actuator and the one or more second actuators,
wherein in the command process, when there is a shortage of control amount with respect to the required control amount with only a first maximum control amount that is a maximum value of a first control amount able to be output by the first actuator, the electronic control unit is configured to command the first maximum control amount to the first actuator, and command, to one of the one or more second actuators, a second control amount for compensating the shortage.

6. A vehicle comprising:
a first actuator configured to control a stroke of a suspension for a control target wheel;
one or more second actuators configured to control the stroke of the suspension and more responsive than the first actuator; and
an electronic control unit configured to:
execute a calculation process to calculate a required control amount for at least one of roll control and pitch control of the vehicle; and
execute a command process to distribute and command the required control amount to the first actuator and the one or more second actuators, wherein:
the suspension is configured as each of a semi-active suspension and a full active suspension,
the one or more second actuators include:
a semi-active actuator configured to make damping force generated by a shock absorber of the suspension variable and applied to the semi-active suspension; and
a full active actuator applied to the full active suspension, and in the command process, when there is a first shortage of control amount with respect to the required control amount with only a first maximum control amount that is a maximum value of a first control amount able to be output by the first actuator, the electronic control unit is configured to command the first maximum control amount to the first actuator, and command, to the semi-active actuator, a second control amount for compensating the first shortage.

\* \* \* \* \*